US009043724B2

(12) United States Patent
Bowers

(10) Patent No.: US 9,043,724 B2
(45) Date of Patent: May 26, 2015

(54) DYNAMICALLY COMPOSED USER INTERFACE HELP

(75) Inventor: Matthew A. Bowers, Waterlooville (GB)

(73) Assignee: Tektronix, Inc., Beaverton, OR (US)

( * ) Notice: Subject to any disclaimer, the term of this patent is extended or adjusted under 35 U.S.C. 154(b) by 1758 days.

(21) Appl. No.: 10/907,759

(22) Filed: Apr. 14, 2005

(65) Prior Publication Data

US 2006/0236265 A1    Oct. 19, 2006

(51) Int. Cl.
*G06F 3/048* (2013.01)
*G06F 9/44* (2006.01)

(52) U.S. Cl.
CPC .................................... *G06F 9/4446* (2013.01)

(58) Field of Classification Search
CPC .................................................... G06F 9/4446
USPC .......................... 715/708, 710, 715, 705, 809
See application file for complete search history.

(56) References Cited

U.S. PATENT DOCUMENTS

| 6,452,607 | B1 | | 9/2002 | Livingston | 345/705 |
|---|---|---|---|---|---|
| 7,020,842 | B1 | * | 3/2006 | DeStefano et al. | 715/741 |
| 2002/0070955 | A1 | * | 6/2002 | Barksdale et al. | 345/708 |
| 2002/0099456 | A1 | * | 7/2002 | McLean | 700/83 |
| 2005/0125744 | A1 | * | 6/2005 | Hubbard et al. | 715/824 |

FOREIGN PATENT DOCUMENTS

WO    WO 02/17644    2/2002

OTHER PUBLICATIONS

European Search Report and Written Opinion on European Patent Application No. EP 06 25 2036 dated Feb. 2, 2009.
J. Ribas-Corbera et al., "A flexible decoder buffer model for jvt videio coding" IEEE ICIP 2002, vol. 2, Sep. 22, 2002, pp. 493-496.
Gauthier Lafruit et al., "Implications of Expiration Time Stamp/Object Lifetime on Memory Management" Video Standards and Drafts, ISO/IEC JTC1/SC29/WG11, No. N2806, Oct. 19, 1997.
M J Carey et al., "Priority in DBMS resource scheduling" Proceedings of the Fifteenth International Conference on Very Large Data Bases, Amsterdam, Netherlands, Aug. 22, 1989, pp. 397-410.

* cited by examiner

*Primary Examiner* — Omar Abdul-Ali
(74) *Attorney, Agent, or Firm* — Matthew D. Rabdau; Michael A. Nelson; Marger Johnson & McCollom PC

(57) ABSTRACT

A user interface help dialog for a computer system is provided in which the computer system has a plurality of system parameters and the user interface includes a plurality of command options that may be enabled or disabled. A cursor for indicating one of the command options is also provided. To generate the help dialog the identity of a disabled command option to which the cursor indicates is first identified. The status of a subset of the system parameters is then evaluated, the system parameters subset being determined in dependence on the identified command option. A help dialog to be displayed to the user is then generated, the content of which is dependent on the status of the evaluated system parameters.

12 Claims, 3 Drawing Sheets

DYNAMICALLY COMPOSED USER INTERFACE HELP

BACKGROUND TO THE INVENTION

Graphical user interfaces (GUIs) are almost universally employed to provide the necessary interface between a computer system and a user to enable the user to access and control the computer system. In general, a number of possible commands are presented to a user for control of the computer system. These commands are typically presented in the form of either a 'drop down' menu, which lists a number of often related command options, or a series of pictorial icons, usually referred to as 'buttons', that represent the commands. The user typically selects the desired command by placing a displayed cursor using a cursor control device, such as a mouse or trackball, over the menu item or button and operating a selection switch on the cursor control device e.g. 'clicking' using a mouse button.

The number of menu options included in a drop-down menu or a set of icons is often large, particularly so for complex computer applications. Consequently, a user often experiences the problem of not knowing, or being confident of, the functions of all the displayed menu items. This problem has been addressed in the prior art in various ways. For example, a common help system in both Windows® and Macintosh® applications operates by tracking the movement of the cursor and presenting small windows, either shaped as cartoon speech bubbles or small dialog boxes, next to the menu item or icon over which the cursor passes. The presented windows contain a description of the menu item that the cursor is currently pointing at.

A disadvantage of the above type of help feature is that no allowance is made for those menu items that are not available. It is common for certain menu items to be operative only if certain other criteria relating to either the computer system itself or the state of the computer application being executed are met. Trivial examples of this include the 'print' menu item not being available if it is detected that no printer is connected to the computer system and the 'copy' function in a word processor not being available if no text has been selected. In this case the unavailable menu item or icon in question is typically shown either 'greyed out' (rendered in greyscale as opposed to color) or 'dimmed' (reduced brightness and/or contrast). In such cases when the cursor is placed over the unavailable menu item either the same help box and text appears as is the case when the menu item is available or no help facility at all is provided. In either case, no information is provided to the user that may explain why the menu item in question is not available in the first place.

U.S. Pat. No. 6,452,607 B1 discusses the provision of a user interface help feature in which an information button, referred to as a help control, is displayed next to a menu item or icon in the event that the menu item is unavailable and deemed noteworthy. On clicking on the information button a user is presented with a help dialog window that contains text describing why the menu item is not available. The text of this description is fixed and must therefore be of a sufficiently generic nature to provide help in all the possible contexts for a user wishing to select the menu item. This tends to reduce the true help value of this feature to users since the help text is non-specific to the context in which they are operating.

SUMMARY OF THE INVENTION

According to a first aspect of the present invention there is provided a method of generating a user interface help dialog for a computer system, the computer system having a plurality of system parameters, the user interface including a plurality of command options that may be enabled or disabled and a cursor for indicating one of the command options, the method comprising determining the identity of a disabled command option to which the cursor indicates, evaluating the status of a subset of the system parameters, the system parameters subset being determined in dependence on the identified command option, and generating a help dialog to be displayed to the user the content of which is dependent on the status of the evaluated system parameters.

In this context, the term 'system parameters' refers to the state of not only the operating system being run by the computer system but also the state of the application being executed and the state of the application data, as well as the state of the computer system hardware.

The subset of system parameters is preferably selected from a number of predefined subsets, each subset of system parameters being associated with a command option. The system parameters may include at least one of the presence of a specified file and the status of at least one of the system parameters.

The step of generating the help dialog preferably includes selecting at least one predetermined dialog segment. The predetermined dialog segment is preferably selected in accordance with the value of at least one of the system parameters in the system parameter subset. Additionally, the step of generating the help dialog may further include inserting the value of at least one of the evaluated system parameters into the selected dialog segment.

According to a further aspect there is provided a computer program comprising a plurality of computer readable instructions that when executed by a computer system cause the computer system to perform the steps of determining the identity of an indicated disabled command option, evaluating the status of a subset of parameters of the computer system, the subset of system parameters being determined in dependence on the identified command option, and generating a help dialog to be displayed to the user the content of which is dependent on the status of the evaluated system parameters. The computer program is preferably embodied on a computer readable medium, such as a CD-ROM, DVD or solid state memory device.

According to a further aspect of the present invention there is provided a computer system comprising a display device, a cursor control for controlling the position of a cursor displayed on the display device and a data processor, the data processor being arranged to: (a) cause a user interface to be displayed on the display device, the user interface having a plurality of command options; (b) determine the identity of a disabled command option to which the cursor indicates; (c) evaluate the status of a subset of a plurality of system parameters of the computing system, the subset being determined in dependence on the identity of the determined command option and (d) generate a help dialog to be displayed on the display device, the help dialog having a content dependent on the status of the evaluated system parameters.

The plurality of predefined system parameter subsets is preferably stored on a data storage medium and each subset is associated with a command option. The data processor is then preferably further arranged to retrieve the system parameter subset associated with the identified command option from the data storage medium prior to evaluating the system parameters.

In preferred embodiments a plurality of help dialog segments are stored on a further data storage medium and the data processor is arranged to retrieve at least one of the help dialog segments from the data storage medium in accordance with the value of the evaluated system parameters. The data processor is preferably arranged to insert at least one of the system parameter values into the help dialog.

BRIEF DESCRIPTION OF THE DRAWINGS

Embodiments of the present invention will now be described below by way of illustrative example only with reference to the accompanying figures of which.

DESCRIPTION OF EMBODIMENTS OF THE INVENTION

Figure 1:
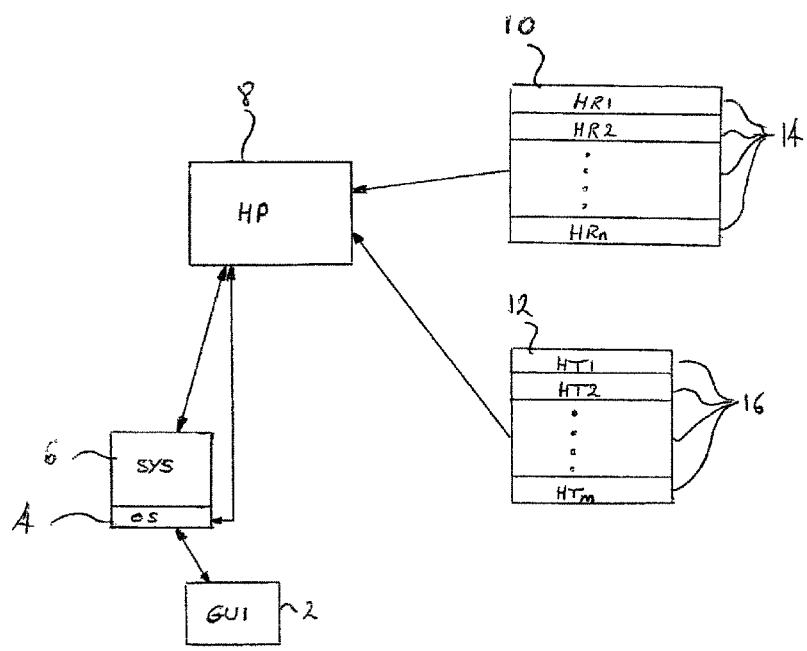
FIG. 1 schematically illustrates the system architecture of a computer system in accordance with embodiments of the present invention.

FIG. 1 schematically illustrates the system architecture of a computer system according to a preferred embodiment of the present invention. A display device 2, such as a monitor, is provided to display the Graphical User Interface (GUI) provided to control the computer system. A pointing device (not shown), such as a mouse, is also provided to control a cursor on the GUI. The display of the GUI is controlled by the operating system (OS) 4 of the computer system, the OS being integrated with the system core 6. The system core includes the main system data processor, memory, input and output devices and optionally further peripherals connected to the computer system. The system core 6 and OS 4 are in communication with a help processor 8. The help processor is in communication with two further data storage devices, a help routine library 10 and a help text library 12. The help routine library stores n number of predefined help routines 14, labelled HR1, HR2, . . . , HRn, whilst the help text library 12 stores m number of segments of help text 16, labelled HT1, HT2, . . . , HTm.

In operation a user controls the cursor on the GUI to place it over a desired command option, typically displayed as an entry in a drop-down menu. If the command option is unavailable, in which case it is still displayed but is greyed-out or dimmed, the identity of the command option is determined by the OS and is communicated to the help processor 8. Each command option has an associated help routine HRn stored in the help routine library and the help processor retrieves the help routine associated with the command option identified by the OS. Each help routine specifies one or more parameters of the system 6 that relate to the associated command option and which are to be evaluated by the help processor 8. Examples of system parameters that may be evaluated are whether or not a specified data file is present, whether or not a specified media file is active, for example a video file, whether or not other specified users options are enabled and whether or not the user is permitted to use a particular feature, as defined by the current software licence, for example. The help processor evaluates the status of the system parameters according to the retrieved help routine and subsequently retrieves one or more help text segments 16 from the help text library 12. The selected help text segments are constructed to form a complete help dialog that informs the user why the identified command option is not enabled and preferably what further action is required to enable the command option.

Additionally, a specified parameter may be formatted into the help text. The selection of the help text segments and parameter values is made by the help processor in accordance with logic held in the help routine and depends on the status of the evaluated system parameters. Consequently the complete help dialog may differ for the same command option depending on the status of the computer system, reflecting the different reasons why the command option is disabled. By dynamically composing the help dialog in this way the quality of help information provided to the user is improved over the prior art since it is not necessary to provide either a single generic help dialog that because it must cover a number of reasons for a command being disabled is too general to provide meaningful help to a user, or to store a large number of pre-composed help dialogs to cover all eventualities.

It will be appreciated that the help routine library 10 and/or the help text segment library 12 may be implemented in the main memory of the system core 6 and equally the help processor may be implemented on a data processor within the system core that executes other processing functions.

Figure 2:
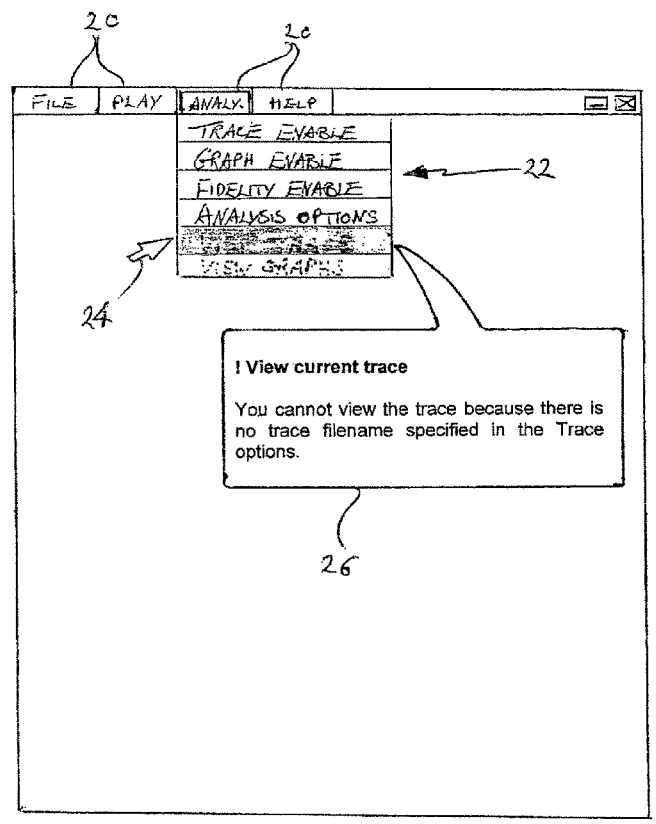
FIG. 2 schematically illustrates an example of the GUI display in accordance with an embodiment of the present invention showing a first help dialog.

FIG. 2 schematically illustrates a possible state of the GUI according to an embodiment of the present invention. A number of main menu options 20 are presented to the user in a horizontal bar across the top of the display. In the example shown in FIG. 2 the menu option labelled 'Analysis' has been selected by the user to reveal a drop-down box of further menu items 22. In the example shown, the last two menu items, labelled 'View Trace' and 'View Graph' are shown in broken text to illustrate that those menu items are disabled and cannot be selected. The cursor 24 is illustrated as indicating the disabled menu item 'View Trace' and as a consequence a help dialog 26 is displayed with a help text that identifies the reason the menu item cannot be selected.

Figure 3:
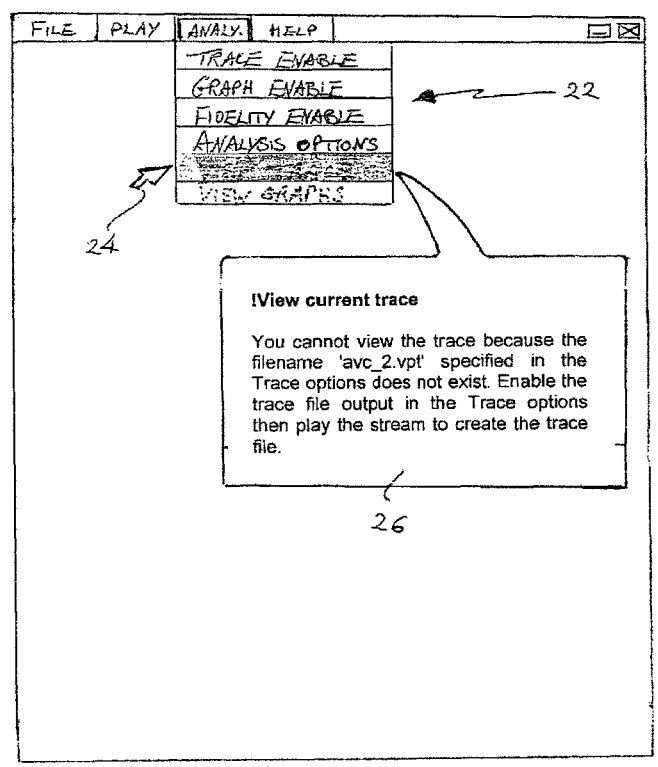
FIG. 3 schematically illustrates an example of the GUI display in accordance with an embodiment of the present invention showing a second help dialog.

As previously explained, the reason a menu item may be disabled will vary according to the status of various other system parameters and in embodiments of the present invention the text of the help dialog 26 will vary depending on these system parameters. FIG. 3 illustrates a further example of the display of the GUI in which the same menu items 22 are displayed and the cursor 24 indicates the same menu item 'View Trace' as in FIG. 2. However, in the example illustrated in FIG. 3 the text of the help dialog 26 is different from that shown in FIG. 2, illustrating that the text of the help dialog is dynamically composed in dependence on one or more system parameters.

What is claimed as new and desired to be protected by Letters Patent of the United States is:

1. A method of generating a user interface help dialog for a computer system, the computer system having a plurality of system parameters, the plurality of system parameters including the state of the computer system hardware, the user interface including a plurality of command options that may be enabled or disabled and a cursor for indicating one of the command options, the method comprising:

determining the identity of a single disabled command option to which the cursor indicates, each command option having an associated help routine specifying a subset of the system parameters that relate to the associated command option, wherein a status of the subset of system parameters contributes to whether the command option is enabled or disabled;

in response to determining the identity of the single disabled command option, directly determining the status of each of the system parameters within the subset of the system parameters, and generating a help dialog to be displayed to the user the content of which is dependent on the status of the evaluated system parameters.

2. A method according to claim 1, wherein the subset of system parameters is selected from a number of predefined subsets, each subset of system parameters being associated with a command option.

3. A method according to claim 1, wherein the system parameters include at least one of the presence of a specified file and the status of at least one of the system parameters.

4. A method according to claim 1, wherein the step of generating the help dialog includes selecting at least one predetermined dialog segment.

5. A method according to claim 4, wherein the predetermined dialog segment is selected in accordance to the value of at least one of the system parameters in the system parameter subset.

6. A method according to claim 4, wherein the step of generating the help dialog further includes inserting the value of at least one of the evaluated system parameters into the selected dialog segment.

7. A computer program comprising a plurality of computer readable instructions that when executed by a computer system cause the computer system to perform the steps of:
   determining the identity of an indicated disabled command option, the command option having an associated help routine specifying a subset of system parameters that relates to the command option, wherein a status of the subset of system parameters contributes to whether the command option is enabled or disabled, and wherein the computer system has a plurality of system parameters, the system parameters including the state of the computer system hardware;
   in response to determining the identity of the single disabled command option, directly determining the status of each of the system parameters within the subset of parameters of the computer system; and
   generating a help dialog to be displayed to the user the content of which is dependent on the status of the evaluated system parameters.

8. A computer system comprising:
   a display device;
   a cursor control for controlling the position of a cursor displayed on the display device; and
   a data processor, the data processor being arranged to:
      cause a user interface to be displayed on the display device, the user interface having a plurality of command options;
      determine the identity of a single disabled command option to which the cursor indicates, the command option having an associated help routine specifying a subset of the system parameters that relates to the command option, wherein a status of the subset of system parameters contributes to whether the command option is enabled or disabled, and wherein the computer system has a plurality of system parameters, the system parameters including the state of the computer system hardware;
      in response to determining the identity of the single disabled command option, directly determine the status of each of the system parameters within the subset of a plurality of system parameters of the computing system; and
      generate a help dialog to be displayed on the display device, the help dialog having a content dependent on the status of the evaluated system parameters.

9. A computing system according to claim 8, wherein a plurality of predefined system parameter subsets are stored on a data storage medium and each subset is associated with a command option.

10. A computing system according to claim 9, wherein the data processor is further arranged to retrieve the system parameter subset associated with the identified command option from the data storage medium prior to evaluating the system parameters.

11. A computing system according to claim 8, wherein a plurality of help dialog segments are stored on a further data storage medium and the data processor is arranged to retrieve at least one of the help dialog segments from the data storage medium in accordance with the value of the evaluated system parameters.

12. A computing system according to claim 9, wherein the data processor is arranged to insert at least one of the system parameter values into the help dialog.

* * * * *